United States Patent [19]

Schoeppel et al.

[11] Patent Number: 5,397,072

[45] Date of Patent: Mar. 14, 1995

[54] DRIVE BELT TEXTURED WITH BUBBLE BURST DISCONTINUITIES FOR USE IN BELT-DRIVEN RECORDING TAPE CARTRIDGE

[75] Inventors: Wolfgang G. Schoeppel, St. Paul, Minn.; David P. Smith, Hudson, Wis.

[73] Assignee: Minnesota Mining and Manufacturing Company, St. Paul, Minn.

[21] Appl. No.: 929,279

[22] Filed: Aug. 12, 1992

[51] Int. Cl.$^6$ ............................................. G11B 23/087
[52] U.S. Cl. ............................... 242/352.4; 242/342; 474/249; 360/132
[58] Field of Search ............... 242/192, 340, 342, 348, 242/352.4, 356.7, 541.3, 564.5; 474/263, 249, 250, 251; 360/132; 226/170

[56] References Cited

U.S. PATENT DOCUMENTS

| | | | |
|---|---|---|---|
| 1,404,848 | 1/1922 | Gusdorf | 474/249 |
| 1,457,243 | 5/1923 | Gusdorf | 474/249 |
| 2,181,001 | 11/1939 | Smith | 474/249 |
| 3,692,255 | 9/1972 | Von Behren | 242/192 |
| 4,054,923 | 10/1977 | Lewis | 242/192 |
| 4,146,194 | 3/1979 | Majicek | 242/192 |
| 4,162,774 | 7/1979 | Bowers | 242/192 |
| 4,342,809 | 8/1982 | Newell | 428/215 |
| 4,379,105 | 4/1983 | Taylor et al. | 264/45.5 |
| 4,466,564 | 8/1984 | Smith et al. | 226/170 |
| 4,581,189 | 4/1986 | Smith et al. | 264/131 |

FOREIGN PATENT DOCUMENTS 4-92275 6/1992 Japan .
4-163776 6/1992 Japan .

OTHER PUBLICATIONS

3M Ad Entitled "Precision Engineered 3M Components for Consistently Superior, Reliable Performance".
Smith et al., "Squeeze–Film Analysis of Tape Winding Effects in Data Cartridge", Presented at the 35th STLE/ASME Tribology Conference, Fort Lauderdale, Fla. (Oct. 1989).
Smith, "Data Cartridge Technology: Removable Data Storage for Current and Future Computer Systems", 1988.
Smith, "Influence of Speed on Tape Winding in Data Cartridge Tape Systems", Proceedings of the Japan International Tribology Conference (1990).
Smith, "Reliability Issues in Data Tape Cartridges", Proceedings of the 5th International Congress on Tribology, vol. 3 (Jun. 14, 1989).
Von Behren et al., "Mechanical Design of a Belt–Driven Data Cartridge", Adv. Info. Storage Syst., vol. 1 (1991).

*Primary Examiner*—Daniel P. Stodola
*Assistant Examiner*—John Q. Nguyen
*Attorney, Agent, or Firm*—Gary L. Griswold; Walter N. Kirn; David B. Kagan

[57] ABSTRACT

A drive belt for a belt-driven recording tape cartridge, wherein the drive belt has inside and outside major surfaces which comprise a plurality of bubble burst discontinuities. Processes for making drive belts with bubble burst discontinuities are also described.

10 Claims, 5 Drawing Sheets

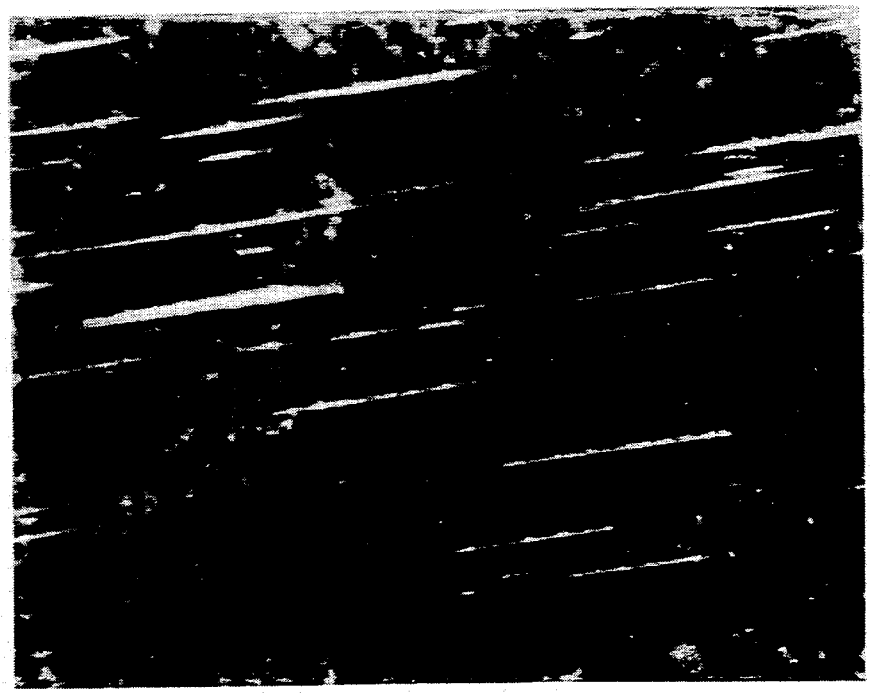
FIG. 4B ← /mm →
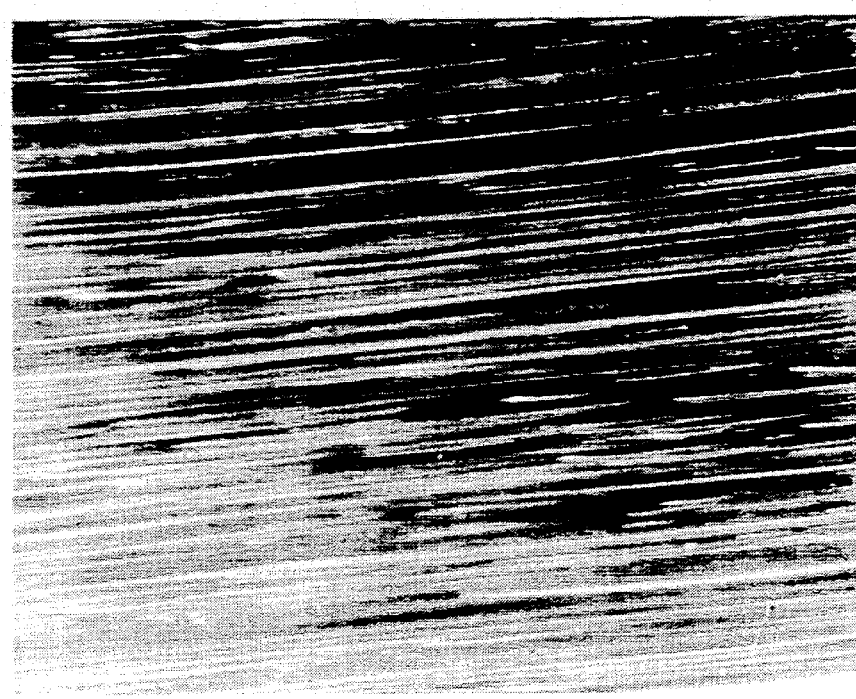
FIG. 4C ← /mm →

DRIVE BELT TEXTURED WITH BUBBLE BURST DISCONTINUITIES FOR USE IN BELT-DRIVEN RECORDING TAPE CARTRIDGE

FIELD OF THE INVENTION

This invention is in the field of belt-driven magnetic recording tape cartridges such as are described in U.S. Pat. No. 3,692,255 (Von Behren). More specifically, this invention relates to an improved drive belt for such belt-driven magnetic recording tape cartridge.

BACKGROUND OF THE INVENTION

The tape cartridge of the Von Behren patent, U.S. Pat. No. 3,692,255, incorporated herein by reference, includes a housing defining a thin, generally rectangular enclosure. The housing contains a length of magnetic recording tape which is wound upon a pair of tape reels. The magnetic recording tape is driven by an elastomeric drive belt which, in turn, is driven by a single reversible drive motor. The drive belt provides rapid acceleration and deceleration of the recording tape in either direction. The drive belt is stretched along a drive belt path generally defined by a drive roller, a pair of guide rollers, and part of the tape pack wound on each reel.

As the drive belt travels over the various rollers and the tape pack of the von Behren tape cartridge, the drive belt most preferably remains in a centered position on these surfaces. However, the drive belt has a tendency to shift away from a centered position. In the absence of a restraining force, the drive belt could run over the edge of a roller, causing catastrophic failure of the tape cartridge. To help prevent the drive belt from shifting away from a centered position, the rollers have been configured with a crown to provide a centering moment. See, e.g., von Behren et al., Adv. Info. Storage Syst., "Mechanical Design of a Belt-Driven Data Cartridge", Vol 1, pp. 49–59 (1991)

Previously known drive belts have been characterized by a flat geometry. A flat geometry drive belt is formed by first punching or cutting an annular ring from a suitable polymeric sheet. The ring is then stretched and distorted into a belt shape for insertion into a tape cartridge. See, e.g., col. 2, lines 57–63 of U.S. Pat. No. 4,466,564. This approach, unfortunately, generates substantial quantities of waste. Much of the polymeric sheet has to be discarded after rings are punched or cut from the sheet.

The quality of magnetically reproduced and recorded information depends, in part, upon precise, accurate tracking of the drive belt during transport (i.e., during playback, recording, fast forwarding, and rewinding). Any irregularities in drive belt tracking can adversely affect recording and reproducing performance.

Tape tensioning characteristics depend, in part, upon the surface texture of the drive belt. If the surface of the drive belt is too smooth, then air tends to become entrapped between the magnetic recording tape and the drive belt as the drive belt moves. When this happens, tape tension is difficult to control. Mechanical instabilities usually result. These instabilities may cause misregistration between a recorded data track and subsequent reading operations, leading to possible signal loss and data errors. See, for example, D. P. Smith, "Influence of Speed on Tape Winding in Data Cartridge Tape Systems", Proceedings of the Japan International Tribology Conference, pages 1899–1903 (1990). To avoid this problem, a drive belt has typically been made with textured surfaces to allow air to escape from under the moving drive belt. See, e.g., U.S. Pat. Nos. 4,466,564 and 4,581,189.

The demand for higher capacity storage systems is increasing. As this demand increases, the demand for faster data transfer rates also increases. Faster data transfer rates require that the drive belt starts, stops, and runs at faster rates as well. Tracking characteristics, however, tend to deteriorate at such faster rates. Accordingly, there continues to be a need for improved drive belts that provide better tracking characteristics at faster data transfer rates.

SUMMARY OF THE INVENTION

The present invention provides drive belts for use in a tape cartridge, wherein the drive belts have a novel surface texture which is formed through the use of blowing agents. Advantageously, the surface texture of the present invention is achieved without embossing the drive belts and without using additives, e.g., inorganic particles, that remain in the body of the drive belt after the drive belt has been formed. The use of additives which remain in the body of the drive belt is undesirable in that such additives tend to degrade the mechanical properties of the drive belt. In a preferred embodiment, the present invention also provides improved drive belts that provide substantially more uniform belt-tracking characteristics than previously known drive belts. The drive belts of the present invention would be particularly advantageous for use in high capacity storage systems which operate at faster data transfer rates.

In one aspect, the present invention concerns a drive belt for a belt-driven tape cartridge. The drive belt has inside and outside major surfaces. The inside and outside major surfaces of the drive belt comprise a plurality of bubble burst discontinuities. The bubble burst discontinuities provide said surfaces with a surface texture sufficient to allow air to escape from between the magnetic recording tape and the drive belt as the drive belt moves.

In another aspect, the present invention concerns a belt-driven recording tape cartridge comprising a housing which includes drive access means. A pair of tape reel hubs are rotatably mounted in the housing on parallel axes. A length of magnetic recording tape is wound on the hubs such that a portion of the tape extends from one hub to the other. Means for defining a tape path in the housing guides the tape from one hub to the other and across at least a portion of the drive access means. A drive belt extends along a drive belt path such that a portion of the drive belt frictionally engages a portion of the magnetic recording tape to cause transport of the tape from one hub to the other. In some embodiments of the present invention, the drive belt is as described above. In other embodiments of the invention, the drive belt has a tubular geometry. In preferred embodiments of the present invention, the drive belt is as described above and has a tubular geometry.

In another aspect, the present invention concerns a process of making a drive belt which has inside and outside major surfaces and is used in a belt-driven recording tape cartridge. The process comprises the steps of:

a) providing an admixture of feed materials, wherein the feed materials comprise a matrix polymer and an amount of a blowing agent effective to provide a plurality of bubble burst discontinuities on each of said inside and outside major surfaces such that said surfaces have a surface texture sufficient to allow air to escape from underneath the drive belt as the drive belt moves;

b) extruding the feed materials to form an extruded product having first and second major surfaces which correspond to the inside and outside major surfaces of the drive belt, wherein extruding occurs under conditions such that the matrix polymer is melted and substantially all of the blowing agent decomposes into gaseous decomposition products which outgas from the extruded tube to form a plurality of bubble burst discontinuities on the first and second major surfaces of the extruded product; and c) isolating a portion of the extruded product to form the drive belt.

BRIEF DESCRIPTION OF THE DRAWINGS

FIGS. 4a, 4b, and 4c are photomicrographs showing the unstretched surfaces of drive belts of the present invention.

DESCRIPTION OF THE PREFERRED EMBODIMENTS

Figure 1:
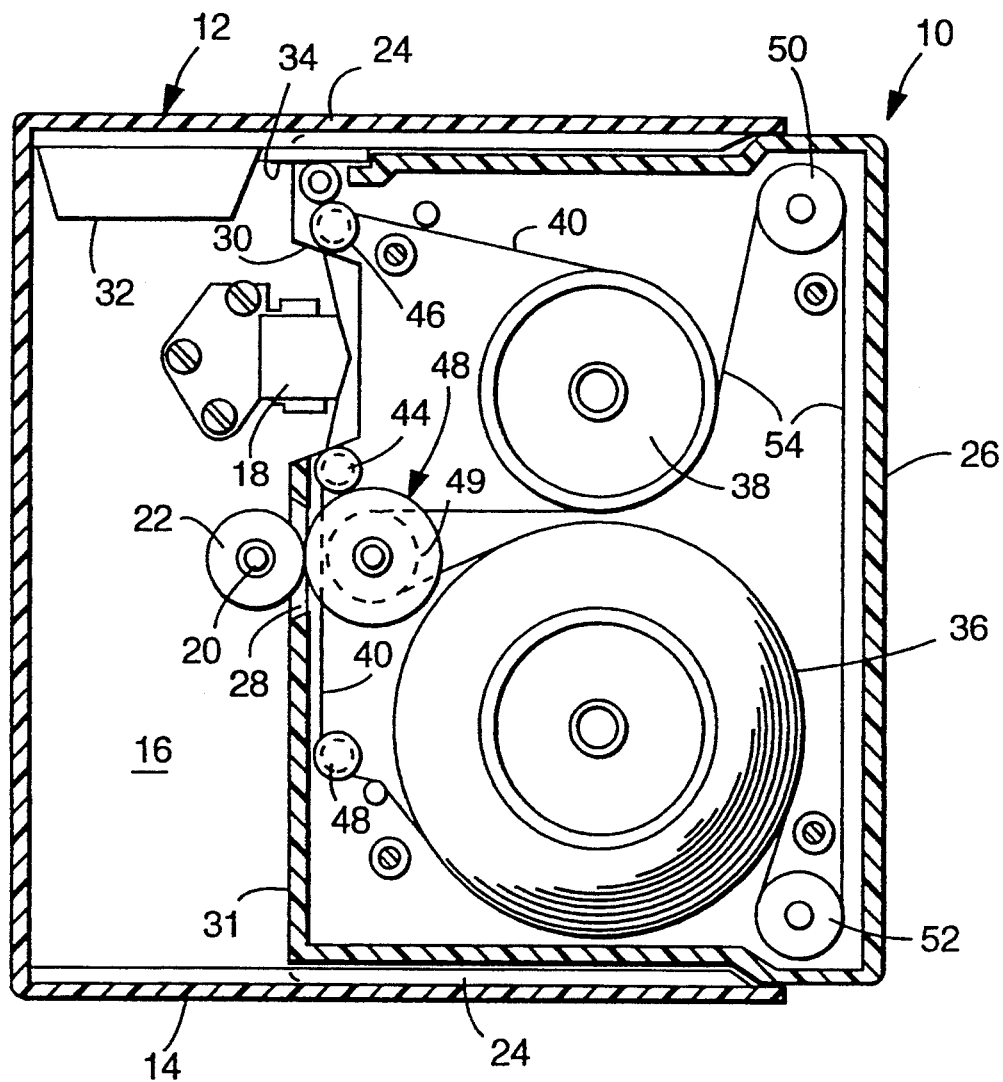
FIG. 1 is a broken-away top view of a tape cartridge inserted in a drive.

Referring now to FIG. 1, there is shown one example of a belt-driven magnetic recording tape cartridge 10 according to the present invention. The cartridge 10 is shown engaged with a magnetic recording apparatus 12. As used herein, "magnetic recording apparatus" means an apparatus for recording or reproducing information that is stored on magnetic or optical recording tape. The magnetic recording apparatus 12 comprises a support frame 14 including a horizontal cartridge support deck 16 supporting a magnetic transducer head 18. The support deck 16 also supports, in a depending manner, a reversible drive motor (not shown), the shaft 20 of which extends through the support deck 16. A drive puck 22 is mounted on the shaft 20 above the support deck 16. Elongate guides 24 define the position of the cartridge 10 on the support deck 16.

The cartridge 10 includes a housing 26 which includes drive access means. In FIG. 1, drive access means comprises openings 28 and 30 which are located on one edgewall 31 of the housing 26. The opening 28 provides access for the drive puck 22. The opening 30 provides access for the transducer head 18. The opening 30 is covered by a door 32 which is biased by a torsion spring 34 towards a closed position covering the opening 30.

A pair of tape reel hubs 36 and 38 are rotatably mounted in the housing 26 on parallel axes. A length of magnetic recording tape 40 is wound on the hubs 36 and 38 such that a portion of the tape 40 extends from one hub to the other hub. Means for defining a tape path in the housing to guide the tape 40 from one hub to the other hub and across the opening 30 includes guide pins 44 and 46. Means for defining a drive belt path includes a belt drive roller 48 and belt guide rollers 50 and 52. The drive belt 54 of the present invention extends along the drive belt path such that the drive belt 54 frictionally engages a portion of the magnetic recording tape 40 to cause transport of the tape 40 from one hub to the other hub.

When the cartridge 10 is engaged with the magnetic recording apparatus 12 as shown in FIG. 1, the drive puck 22 contacts the belt drive roller 48 through the opening 28, and the transducer head 18 contacts the tape 40 through the opening 30. A belt-contacting portion 49 of the drive belt roller 48 is recessed to permit the tape 40 to pass across the drive belt roller 48 without touching the drive puck 22. Cartridges such as cartridge 10 and their operation have been described in U.S. Pat. Nos. 3,692,255 and 4,581,189.

The length of the unstretched drive belt 54 is less than the length of the drive belt path so that the belt 54 is stretched when inserted into the cartridge 10. As one example, providing a drive belt whose unstretched length is 20% to 33%, of the length of the drive belt path has been found to be suitable in the practice of the present invention. Typically, the unstretched drive belt 54 may have a thickness of about 8 mils (0.2 mm).

Figure 2:
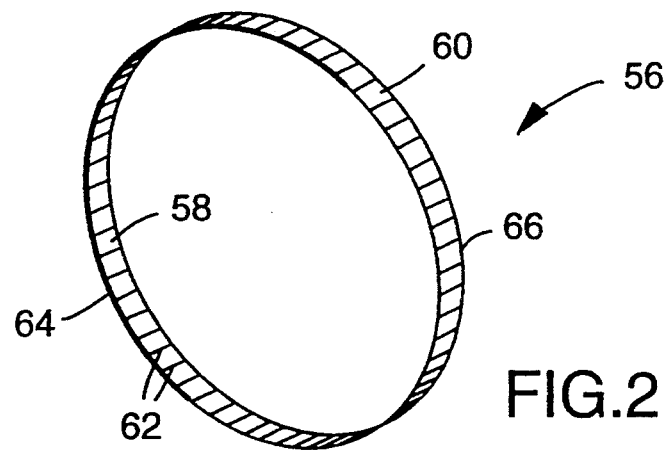
FIG. 2 is a perspective view of a drive belt of the present invention in which transversely oriented surface texture is shown schematically.

Referring now to FIG. 2, there is shown a drive belt of the present invention in a stretched condition. The stretched drive belt 56 has a generally cylindrical shape and includes a top edge 64, a bottom edge 66, an inside major surface 58, and an outside major surface 60. In order to prevent air from becoming entrapped under the drive belt as it moves, the inside major surface 58 and outside major surface 60 have a plurality of bubble burst discontinuities (shown schematically as 62) such that said surfaces have a surface texture sufficient to allow air to escape from underneath the drive belt 56 as it moves. Preferably, the bubble burst discontinuities 62 provide said surfaces with a surface texture having a roughness in the range from 1 to 6 microns (Ra). In the practice of the present invention, the roughness of surface texture is measured on an unstretched drive belt according to DIN 4768 Teil 1.

The drive belt 56 of FIG. 2 may have a flat sheet geometry or a tubular geometry. As used herein, the phrases "tubular geometry" and "flat geometry" refer to the geometry of the drive belt in an unstretched state. Preferably, the drive belt 56 has a tubular geometry. "Tubular geometry" means that the drive belt is a true cylinder as compared to the flat geometry belts of the prior art. We have observed that flat geometry belts have a tendency to shift away from a centered position on the various rollers that guide the drive belt, even when such rollers are configured with a crown. We have now discovered that this shifting is caused, in part, by the flat geometry of conventional drive belts. When such drive belts are formed from flat sheets and then stretched and distorted to form a drive belt, the resulting drive belt has a different elongation at each edge. Such nonuniform elongation yields nonuniform stresses which adversely affect the tracking characteristics of the belt. Tubular drive belts of the present invention are characterized by more uniform elongation when stretched since they have a true cylindrical shape. As a result, tubular drive belts of the present invention provide substantially more uniform belt tracking characteristics than do flat geometry drive belts.

Drive belts of the present invention are preferably prepared from feed materials comprising a matrix polymer and a blowing agent. The matrix polymer may be any polymer or combination of polymers known in the art to be suitable for making drive belts. Such polymers are typically flexible, elastomeric materials that are durable enough to withstand the high speeds and abrupt starts and stops experienced by a data cartridge drive belt. Particularly preferred polymers include thermoplastic polyester polyurethanes commercially available as Desmopan 392 and Desmopan 385 from Miles, Inc., Pittsburgh, Penn. These polyester polyurethanes have a relatively flat stress/strain curve at typical drive belt elongations. This characteristic provides drive belts whose mechanical properties vary less with changes in elongation relative to polymers whose stress/strain curve is steeper.

The term "blowing agent" means a compound, or mixture of compounds, which substantially decompose into gaseous decomposition products when heated to an elevated temperature. "Elevated temperature" means a temperature equal to or greater than a temperature within the softening temperature range of the matrix polymer. Most preferably, the blowing agent decomposes into decomposition products that are substantially inert relative to the matrix polymer. That is, the decomposition products are substantially nonreactive with the matrix polymer.

Examples of suitable blowing agents include azodicarbonamide, zinc carbonate, sodium bicarbonate, p-toluene-sulfonyl-semicarbazide, 4-amino-urazol, aminodiphenyl-triazole, triphenyl-S-triazine, 3,5-diphenyl-1,2,4-triazol, and the like. Preferably, the blowing agent is selected from azodicarbonamide and p-toluene-sulfonyl-semicarbazide. More preferably, the blowing agent is azodicarbonamide.

The blowing agent is used in an amount effective to provide the desired amount of surface texture. Preferably, however, the amount of blowing agent is limited so that substantially all of the gaseous decomposition products outgas from the extruded tube. If too much blowing agent is used, some of the gaseous decomposition products may become trapped within and weaken the matrix polymer. Generally, using 0.01 to 0.4, preferably 0.05 to 0.2, and more preferably about 0.1, weight percent of blowing agent has been found to be suitable in the practice of the present invention. The weight percent of blowing agent is based on the total weight of the blowing agent and the matrix polymer. The weight percent of the blowing agent is the major factor affecting the amount of bubble burst discontinuities, and, therefore, the surface texture, of the resulting drive belt. Generally, the number of bubble burst discontinuities increases as the weight percent of the blowing agent is increased.

As an option, the matrix polymer and the blowing agent may be "pre-extruded" to obtain a more homogeneous admixture. "Pre-extruding" is carried out by extruding the matrix polymer and a suitable blowing agent through an extruder under conditions such that the matrix polymer melts, but under which the blowing agent does not decompose into gaseous decomposition products.

The feed materials are extruded through an appropriate die to form an extruded product having first and second major surfaces which correspond to the inside and outside major surfaces of the drive belt. respectively. For example, in the case of a flat geometry belt, the extruded product is a polymeric sheet having first (top) and second (bottom) major surfaces. When annular rings are isolated, e.g., punched or cut, from the sheet and stretched to form a drive belt, each of the top and bottom major surfaces of the sheet will correspond to one of the major surfaces of the drive belt. In the case of a drive belt with tubular geometry, the extruded product is a cylindrical tube with inside and outside major surfaces. When cylindrical portions of the tube are isolated, e.g., cut or sliced, to form drive belts, the inside and outside major surfaces of the tube will correspond to the inside and outside major surfaces of the drive belt, respectively.

Extruding takes place under conditions such that the matrix polymer is a melt inside the extruder. Preferably, extruding takes place at a temperature equal to or greater than a temperature within the softening range of the matrix polymer. According to the present invention, the matrix polymer may be fed into the extruder as a solid, e.g., solid pellets, in which case the polymer will melt inside the extruder. Extruding also takes place under conditions such that substantially all of the blowing agent decomposes into gaseous decomposition products which outgas from the extruded product. Such outgassing leaves crater-like structures, i e., "bubble burst discontinuities", on the surfaces of the extruded product, thereby increasing the surface texture of these surfaces. The bubble burst discontinuities are generally elongated in the extrusion direction. After extruding, portions of the extruded product are isolated to form drive belts of the present invention.

Even though the weight percent of the blowing agent is the major factor affecting the amount of bubble burst discontinuities, the cooling rate of the extruded product may also affect surface texture, but to a lesser degree. If the cooling rate is too fast, then the matrix polymer will solidify before the gaseous decomposition products have a chance to outgas. This weakens the resulting drive belts. Accordingly, the cooling rate should be slow enough to allow substantially all of the gaseous decomposition products to outgas from the extruded tube. For example, an extruder output of 44 g/min has been found to provide a suitable cooling rate in the practice of the present invention.

Modifying the surface texture of the die lips also affects the surface roughness of the extruded tube. Rougher die lips provide rougher surfaces relative to smoother die lips. Therefore, by using different die lip textures corresponding to the inside and outside major surfaces of the extruded tube, it is possible to produce tubes having a different level of surface texture on each major surface.

After being formed, drive belts of the present invention preferably may be annealed. According to one annealing technique, drive belts of the present invention may be annealed in an unstretched state. For example, annealing an unstretched belt at 65° C. to 150° C. for 1 second to 6 hours, more preferably 4 to 6 hours, would be suitable in the practice of the present invention.

Alternatively or additionally, drive belts of the present invention may be annealed according to a "hot stretching process". The hot stretching process is carried out by stretching a drive belt between two rollers to a desired elongation, e.g., 200% to 500% elongation while the belt is exposed to a heat source under conditions sufficient to anneal the drive belt. During exposure, the drive belt is driven around the rollers so that the entire length of the belt is heated evenly.

One apparatus found to be suitable for carrying out the hot stretching process is the Infrared Line Heater 5193-2 from Research, Inc., Minneapolis, Minn., U.S.A. This apparatus has elliptical reflectors to focus infrared light from a lamp source onto the drive belt, which is disposed about 10 cm from the infrared lamp source. Generally, exposure times of less than one minute, e.g., 2.5 seconds, have been found to be suitable in the practice of the present invention. The lamp output may be set at 350 watts at the beginning of the exposure time and gradually increased to 450 watts by the end of the exposure time. Typically, hot stretching causes the temperature of the belt to be increased from room temperature to over 100° C., e.g., 160° C.

One example of a particular process for making flat geometry belts of the present invention comprises mixing the matrix polymer and the blowing agent after which these feed materials are extruded through an extruder to form a polymeric sheet. As one option, the polymeric sheet may be extruded into water and then stored on a roll for subsequent processing into drive belts with a flat geometry. Alternatively, the extruder discharges the polymeric sheet onto a cooling roll coated with a silicone release agent. Preferably, compressed air is blown onto both surfaces of the sheet before the sheet contacts the cooling roll. Such blowing helps to reduce flattening of the bubble burst discontinuities as the sheet contacts the cooling roll. As an alternative to blowing compressed air onto the sheet, it is also possible to increase the distance between the cooling roll and the extruder die. After the polymeric sheet has been cooled to about room temperature, the sheet may be stored on a roll for subsequent processing into drive belts with a flat geometry. The winding tension of the sheet should be low to avoid stretching the sheet.

Figure 3:
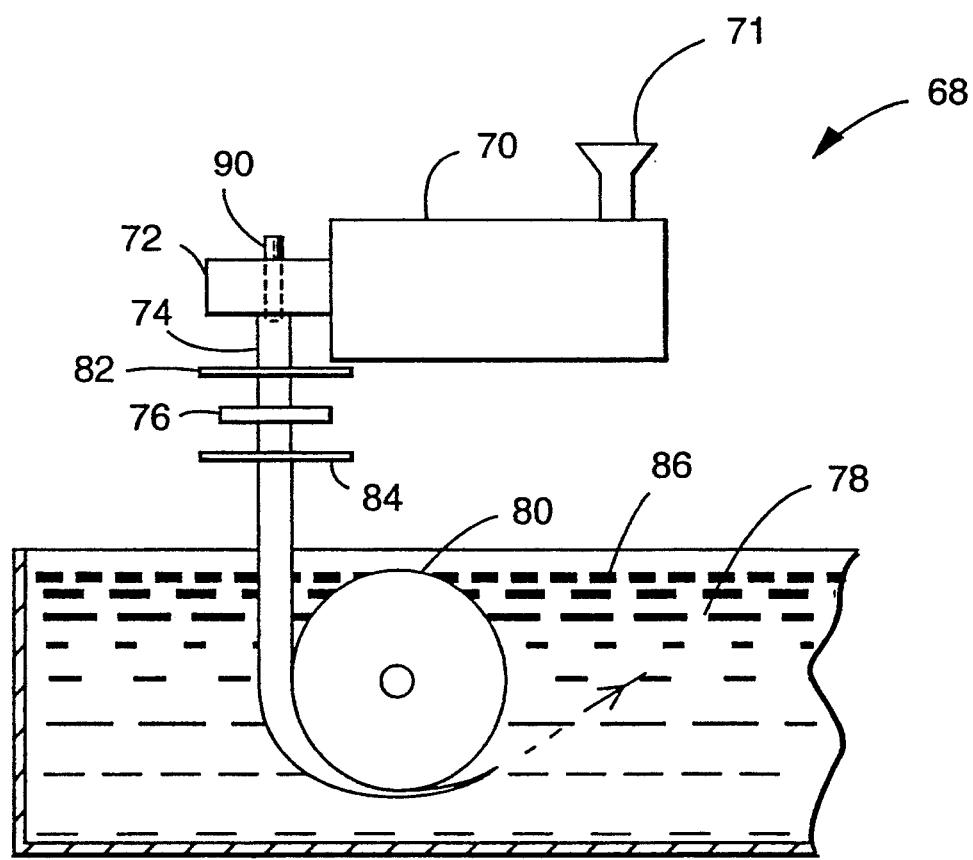
FIG. 3 is an elevational schematic with parts broken away showing an apparatus used to make tubular drive belts of the present invention.

One example of a particular process for making tubular geometry drive belts will now be described with reference to the apparatus 68 shown schematically in FIG. 3. As shown in FIG. 3, the feed materials used to form the drive belt are fed into an extruder 70 through hopper 71 and then extruded through a circular die 72. "Circular die" means that the die 72 has die lips (not shown) defining a substantially circular opening so that the extruded product is a substantially cylindrical tube 74. The particular die and extruder may be any suitable die and apparatus known in the art. The die, however, should be selected to minimize weld lines where the extruder flow comes together in the die. The die should also be selected so that the extruded tube has a uniform wall thickness. For example, a preferred die would be a spiral mandrel die.

The extruded tube 74 leaves the die 72 in the downward direction and is guided past an air cooling coil 76 into a cooling bath 78. The tube 74 passes a guide roller 80 after which cylindrical portions of the tube may then be sliced, cut, or otherwise isolated from the tube to form individual drive belts with tubular geometry or the tube may be stored on a take-up roll (not shown) for subsequent handling. Inasmuch as the tubular drive belts are actually cylindrical portions that have been isolated from the cylindrical, extruded tube, drive belts of the present invention may be manufactured without generating the substantial amount of scrap that results from the manufacture of flat geometry belts.

Air is blown onto the extruded tube 74 through the air cooling coil 76 shortly after the tube 74 leaves the die 72. The blown air helps to stabilize the tubular shape of the tube 74. An upper diaphragm 82 forms a barrier between the air cooling coil 76 and the die 72 so that the blown air does not cool the lips of the die. A lower diaphragm 84 forms a barrier between the air cooling coil 76 and the cooling bath 78 so that the blown air does not disturb the surface 86 of the cooling bath 78.

To prevent the extruded tube 74 from collapsing before it reaches the cooling bath 78, and to control the diameter of the tube 74, the interior of the tube may be filled with a fluid, such as water or air, through an inlet tube 90 which passes through the die 72 and opens into the interior of the extruded tube 74. Preferably, the fluid is supplied through the inlet tube 90 as needed at a pressure such that the ratio of $\phi_W$ to $\phi_D$ is in the range from 1:1 to 3:1, wherein $\phi_W$ is the outside diameter of the extruded tube at the surface 86 of the cooling bath, and $\phi_D$ is the diameter of the extruded tube as it leaves the die.

Figure 4A:

FIGS. 4a, 4b, and 4c are photomicrographs of the unstretched outside surfaces of tubular drive belts of the present invention prepared from a polyester polyurethane (Desmopan 392) and 0, 0.05, and 0.1 weight percent of azodicarbonamide, respectively. As can be seen from these Figures, the surfaces of the drive belts shown in FIGS. 4b and 4c comprise a plurality of bubble burst discontinuities which resulted from the outgassing of gaseous decomposition products. Generally, each of the bubble burst discontinuities has an elongated, substantially oval shape. This shape and structure is characteristic of bubble burst discontinuities in general and depends, in substantial part, upon the rate at which the extruded tube is pulled from the extruder. Generally, faster rates provide bubble burst discontinuities with greater elongation than slower rates.

As the extruded tube is pulled from the extruder, the bubble bursts tend to elongate in a direction along the length of the extruded tube. Thus, when a portion of the extruded tube is sliced from the tube to form a tubular drive belt, the bubble bursts will be elongated in a direction perpendicular to the length of the drive belt. For example, as seen from FIGS. 4b and 4c, the major axes of the bubble burst discontinuities are substantially parallel with each other. Moreover, because the edges of these drive belts are located towards the bottom and top edges of each photomicrograph, it can also be observed that the bubble burst discontinuities are elongated in a direction substantially perpendicular to the length of the drive belt. According to the present invention, bubble burst discontinuities aligned in a direction substantially perpendicular to the length of the drive belt are defined as being "transversely oriented". As compared to prior art drive belts having discontinuities that are oriented substantially parallel to the length of the drive belt, practical tests have shown that preferred drive belts of the present invention having transversely oriented discontinuities are more effective at allowing air to escape from under the drive belt as it moves.

The present invention will now be further described with reference to the following examples.

EXAMPLE 1

Drive belt samples 1A, 1B, and 1C of the present invention were prepared from feed materials comprising polyester polyurethane pellets (Desmopan 392) and azodicarbonamide (Porofor ADC/E available from Bayer AG) according to the following formulations:

| Sample | Parts by weight Polyurethane | Parts by weight azodicarbonamide |
| --- | --- | --- |
| 1A | 100 | 0 |
| 1B | 100 | 0.05 |
| 1C | 100 | 0.1 |

For each sample, the polyurethane was dried for 2 hours at 100° C. in a desiccant dryer. For samples 1B and 1C, the dried polyurethane pellets were taken from the dryer and combined with the azodicarbonamide in a bucket. The bucket was then agitated by hand to mix the ingredients. At the time of agitation, the dried polyurethane pellets were still warm from being dried. Using the process scheme shown in FIG. 3, the feed materials were then extruded to form extruded tubes. The extruder was operated as follows:

| | |
| --- | --- |
| Screw diameter | 1 inch (2.54 cm) |
| L/D ratio | 25 |
| Compression ratio | 1:3 |
| Screw speed | 50 rpm |
| Temperatures: | |
| Feeder | 20° C. |
| Zone 1 | 190° C. |
| Zone 2 | 200° C. |
| Zone 3 | 210° C. |
| Die | 210° C. |
| Pressure | 75 bars (7.6 × $10^6$ N/m$^2$) |
| Output | 44 g/min |

After extruding, the extruded tubes were flattened and then sliced into cylindrical portions to form drive belts. Samples 1A, 1B, and 1C correspond to the drive belts shown in FIGS. 4a, 4b, and 4c, respectively.

Figure 5:
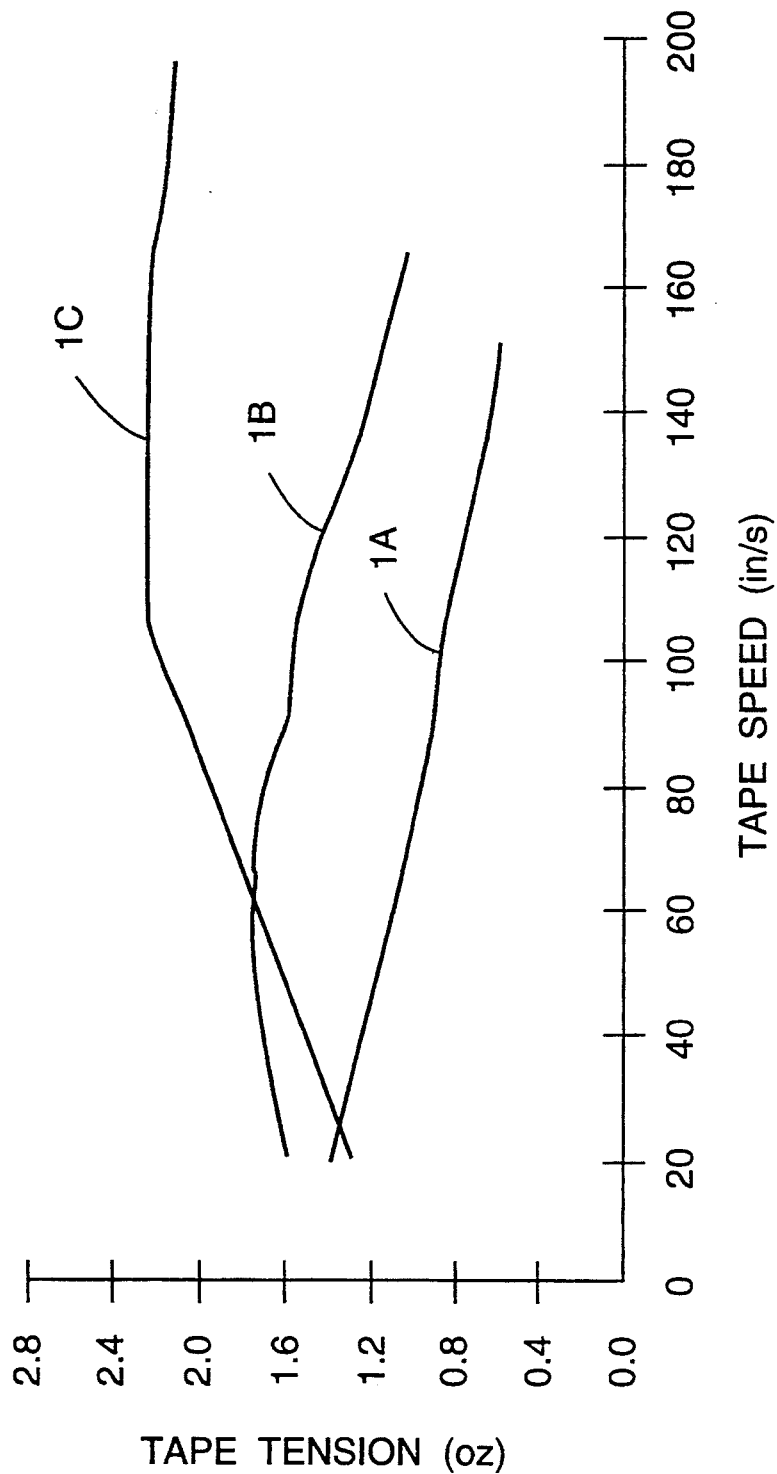
FIG. 5 is a graph of tape tension versus tape speed for three embodiments of the present invention.

Drive belt samples 1A, 1B, and 1C were installed in tape cartridges. Tape tension as a function of tape speed was determined for each sample. The results are shown in FIG. 5. As seen from FIG. 5, drive belts 1B and 1C, whose surfaces comprised bubble burst discontinuities, generally provided greater tape tension at a particular tape speed relative to drive belt 1A, whose surfaces had no bubble burst discontinuities. The tubular drive belts had an unstretched diameter of about 1.19 inches (3.0 cm), an unstretched width of 0.25 inches (6.3 mm), and an unstretched wall thickness of about 7.5 mils (0.19 mm).

EXAMPLE 2

Drive belt samples 2A, 2B, and 2C were prepared in accordance with Example 1, except that another polyester polyurethane (Estane 58277 available from BF Goodrich) was used in place of the Desmopan 392 polyester polyurethane.

EXAMPLE 3

Drive belt sample 3C was prepared using the procedure used to prepare sample 1C of Example 1, except that a blend of 80 parts by weight of Desmopan 392 polyester polyurethane and 20 parts by weight of Estane 58277 polyester polyurethane was used in place of the Desmopan 392 polyurethane.

EXAMPLE 4

Tubular drive belt sample 4A was made according to the procedure used to make drive belt sample 1C. The belt tracking characteristics of this drive belt were compared to those of various flat geometry drive belts. Embossing techniques were used to texture the surfaces of the flat geometry belts. The testing apparatus contained a driving roller and a driven roller positioned on a movable rail so that each drive belt sample could be operated at various elongations. Each drive belt was mounted in a centered position onto the rollers. A precision micrometer was used to measure the distance between a flange on the driven roller edge and the edge of the drive belt after the belt had been run and allowed to seek its equilibrium position. After a measurement was made, the belt was turned over to present the other edge of the belt towards the flange, and the test was repeated. A belt tracking displacement ("BTD") was calculated as the absolute value of the difference between the two measured distances. BTD measurements were made several times for each belt. The flat geometry belts showed average BTD values of about 0.51 mm, whereas there was no measurable BTD for the tubular belt.

Other embodiments of this invention will be apparent to those skilled in the art from a consideration of this specification or from practice of the invention disclosed herein. Various omissions, modifications, and changes to the principles described herein may be made by one skilled on the art without departing from the true scope and spirit of the invention which is indicated by the following claims.

What is claimed is:

1. A polymeric drive belt for a belt-driven recording tape cartridge, wherein the polymeric drive belt has inside and outside major surfaces which comprise a plurality of bubble burst discontinuities, said drive belt being formed from a feed material comprising a matrix polymer and a blowing agent under conditions such that the blowing agent decomposes into gaseous decomposition products which outgas from the matrix polymer to provide the bubble burst discontinuities.

2. The polymeric drive belt of claim 1, wherein the drive belt has a tubular geometry.

3. The polymeric drive belt of claim 1, wherein the bubble burst discontinuities are substantially transversely oriented.

4. The polymeric drive belt of claim 1, wherein said bubble burst discontinuities provide each of said major surfaces with a surface texture in the range from 1 to 6 microns (Ra).

5. The polymeric drive belt of claim 1, wherein the drive belt is formed from materials comprising a polyurethane polymer.

6. A belt-driven magnetic recording tape cartridge, comprising:
   a) a cassette housing which includes means allowing drive access;
   b) a pair of tape reel hubs rotatably mounted in the housing on parallel axes;
   c) a length of magnetic recording tape wound on the hubs such that a portion of the tape extends from one hub to the other;
   d) means defining a tape path in the housing to guide the tape from one hub to the other and across at least a portion of said means allowing drive access;
   e) means defining a polymeric drive belt path; and
   f) a polymeric drive belt extending along the polymeric drive belt path such that the polymeric drive belt frictionally engages a portion of the magnetic recording tape to cause transport of the tape from one tape reel hub to the other, wherein the polymeric drive belt has inside and outside major surfaces which comprise a plurality of bubble burst discontinuities, said drive belt being formed from a feed material comprising a matrix polymer and a blowing agent under conditions such that the blowing agent decomposes into gaseous decomposition products which outgas from the matrix polymer to provide the bubble burst discontinuities.

7. The belt-driven magnetic recording tape cartridge of claim 6, wherein the polymeric drive belt has a tubular geometry.

8. The belt-driven magnetic recording tape cartridge of claim 6, wherein said bubble burst discontinuities provide each of said major surfaces of the polymeric drive belt with a surface texture in the range from 1 to 6 microns (Ra).

9. The belt-driven magnetic recording tape cartridge of claim 6, wherein the polymeric drive belt is formed from materials comprising a polyurethane polymer.

10. The belt-driven magnetic recording tape cartridge of claim 6, wherein the bubble burst discontinuities are substantially transversely oriented.

* * * * *